United States Patent [19]

Ray et al.

[11] 4,033,782
[45] July 5, 1977

[54] CALCIUM ALUMINATE CEMENT COMPOSITIONS AND MIXES AND METHOD FOR PREPARING THEM

[75] Inventors: James Allen Ray, Mantua; Thomas Joseph Lazio, Solon, both of Ohio

[73] Assignee: Martin Marietta Corporation, Bethesda, Md.

[22] Filed: Mar. 23, 1976

[21] Appl. No.: 669,734

[52] U.S. Cl. .............................. 106/104; 106/314; 106/315

[51] Int. Cl.$^2$ ...................... C04B 7/02; C04B 13/20

[58] Field of Search ............. 106/104, 315, 90, 314

[56] References Cited

UNITED STATES PATENTS

| | | | |
|---|---|---|---|
| 3,210,207 | 10/1965 | Dodson et al. | 106/90 |
| 3,619,221 | 11/1971 | Kossivas | 106/315 |
| 3,801,338 | 4/1974 | Whitaker | 106/90 |
| 3,826,665 | 7/1974 | Hovasse et al. | 106/104 |

*Primary Examiner*—J. Poer

[57] ABSTRACT

Compositions and mixes of calcium aluminate cement with or without aggregates and with controlled amounts of calcium formate and preparation of the same, which significantly accelerate the setting times and early compressive strength gain of the product formed after addition of water for hydraulic setting of the cement.

By careful control of composition and particularly of amount of calcium formate included, new calcium aluminate cement compositions and mixes are provided, useful for patching, topping and other uses where fast setting, and high early strength characteristics are required.

37 Claims, 6 Drawing Figures

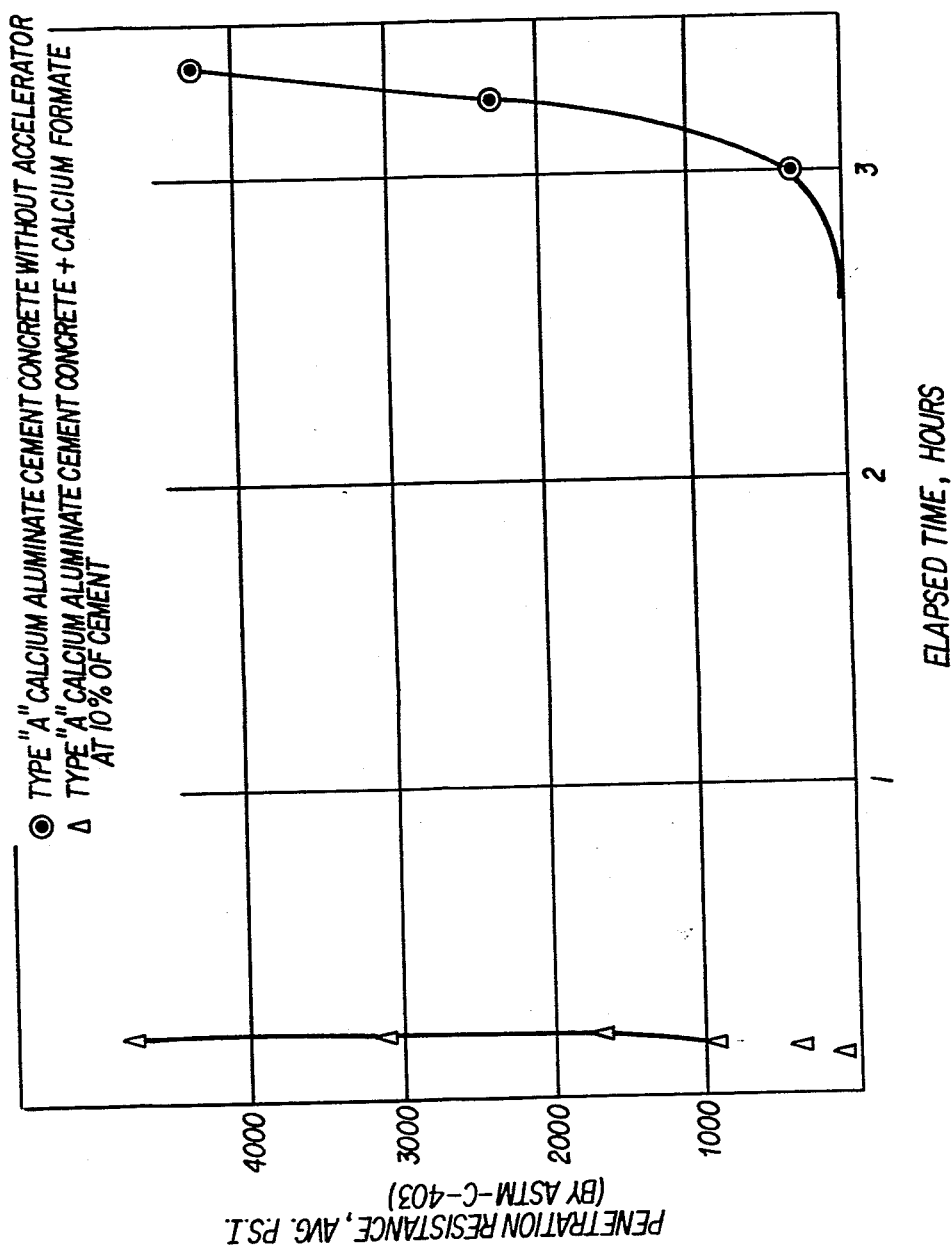

CALCIUM ALUMINATE CEMENT COMPOSITIONS AND MIXES AND METHOD FOR PREPARING THEM

This invention relates generally to calcium aluminate cement and more particularly to calcium aluminate cement compositions and an additive for calcium aluminate cement which may be added to the cement during its manufacture to produce fast-setting high-early strength grouts, mortar, or concretes that are adapted to use as patching or topping compositions where only limited time is available for the work. Also, the additive may be used as an admixture by introducing it before addition of water to calcium aluminate cement compositions (which may or may not contain aggregate material) or by introducing it to calcium aluminate cement mixes either immediately during or after inclusion of water. Likewise, the additive may be used in dry-packaged grout, mortar, concrete or the like to which only water need be added at the site of the work.

Calcium aluminate cements and Portland cements are both designated "hydraulic cements" but the two cements differ substantially in chemical composition and in response to additives used to effect setting and hardening by hydration of the cement. Portland cement represents a class of hydraulic cements which contain a substantial quantity of calcium silicate with only minor quantities of aluminates, namely, tricalcium aluminate and a calcium aluminoferrite. Portland cement is produced by heating to incipient fusion an intimate mixture of calcareous and argillaceous, or other siliceous, aluminious, and ironoxide-bearing materials to form a clinker. The clinker is pulverized and a small amount of calcium sulphate, usually gypsum, is added to improve the setting characteristics of the finished cement.

Calcium aluminate cements (also known as high-alumina cements) are obtained, on the other hand, by rotary kiln or reverberatory furnace fusion or sintering of a mixture of aluminous and calcium-containing materials, usually bauxite and limestone to form a melt or sinter. A high-alumina cement is disclosed, for example, in U.S. Pat. No. 2,099,176. High-alumina cement is composed of essential amounts of monocalcium aluminate ($CaO \cdot Al_2O_3$). Generally high alumina cements, i.e., calcium aluminate cements, have an $Al_2O_3$ content of at least 30 to 35% by weight and may contain minor amounts of $TiO_2$. The $Al_2O_3$ plus $TiO_2$ content of some such cements may be as high as 79% by weight. On the other hand the $SiO_2$ content is low being generally in the range about 0.1% to about 9% by weight. On the other hand, Portland cements contain as the essential constituents tricalcium silicate ($3CaO \cdot SiO_2$) and dicalcium silicate ($2CaO \cdot SiO_2$). Monocalcium aluminate ($CaO \cdot Al_2O_3$) is not known to be present in the Portland cement. Since the two cements have different chemical compositions, they respond differently to chemical additives. As explained at page 125 of the book "High-Alumina Cements and Concretes" by Robson, published by John Wiley & Sons, Inc., 1962, it has been accepted by the cement industry that the effect of an additive on calcium aluminate cement cannot be predicted from results obtained with Portland cement, or vice versa.

For example, it is generally accepted in the cement industry that calcium chloride must never be added to highalumina cement because of its unpredictable and commonly deleterious effects. Yet, calcium chloride is widely and successfully used as an admixture for Portland cement mixes. Similarly, not all lithium salts are effective in producing fast setting and early-strength development in Portland cement mixes. Only lithium salts having certain selected associated anions are effective, whereas soluble lithium salts produce accelerated setting and highearly strength development of calcium aluminate cement mixes probably regardless of the identity of the anion. Moreover, calcium hydroxide accelerates the setting of calcium aluminate cement, but causes little effect on the setting of Portland cement mixes. Sodium, potassium and barium chlorides, as well as hydrochloric acid, retard the setting of calcium aluminate cement mixes but accelerate the setting of Portland cement.

Various kinds of additives for accelerating the setting of Portland cement have been disclosed. For example, an additive for Portland cement containing a minor amount of benzoic acid or an alkali metal salt, alkaline earth metal salt or ammonium salt of benzoic acid, chromic acid or nitrous acid and a major amount of calcium formate is disclosed in U.S. Pat. No. 3,210,207. The additive is to contain from 80% to 98% calcium formate and is to be mixed with the cement in an amount of from 0.2% to 10% by weight. This additive is to be used instead of calcium chloride in making steel-reinforced Portland-cement concrete to avoid corrosion of the reinforcement.

A set-accelerating additive for Portland cement concrete is disclosed in U.S. Pat. No. 3,619,221. The additive contains any of various water-soluble amine salts of formic acid. The cementitious composition is to contain 0.01 to 10 percent by weight of the amine salt. According to the disclosure in this patent, the amine formate, unlike a calcium formate additive, increases the 7 and 28 day compressive strengths of concrete prepared with Portland cement.

A mixture of a major amount of sodium nitrite and a minor amount of calcium formate along with triethanolamine or sodium benzoate is disclosed as an additive for Portland and sulphate-resisting cements used to make metal reinforced concrete in U.S. Pat. No. 3,801,338. The additive may comprise from 19% to 48% calcium formate, 81% to 52% sodium nitrite and 0.1% to 10% triethanolamine or sodium benzoate. The additive is to be mixed with the cementitious composition in amounts of up to 20% by weight, preferably 1% - 6% by weight. The additive reduces the initial and final setting times of the cements but the initial setting times are still more than 2 hours with a final setting time of more than 3.5 hours and possibly as high as 8 hours initial and more than 11 hours final setting time.

It has been proposed before to use chemical additives in calcium aluminate cement containing compositions to modify their setting and hardening characteristics. For example, high-alumina cement, mortar and concrete containing 0.005% to 1% lithia or water-soluble lithium salt and a hydroxylated organic acid are disclosed in U.S. Pat. No. 3,826,665. In accordance with the disclosure in the patent, the lithium compound alone causes the cement product to become rigid and a lithium content of 0.03% or more with respect to the cement adversely affects the spreading of the product. The addition of both a lithium compound and a hydroxylated organic acid, on the other hand, allegedly accelerates the setting time without seriously altering the fluidity or handling characteristics of the product. The use of an additive which must contain two or more chemicals to counteract each other or separately modify characteristics of the cement composition has the obvious disadvantage of inconvenience and increased cost involved in handling more than one chemical.

It is an object of this invention to provide an improved calcium aluminate cement composition for use in grout or neat cement mixes, mortar mixes, or concrete mixes and similar mixes adapted for use as toppings, patches and other mixes where fast setting and high-early strength are necessary or desirable. Another object of the invention is to provide an improved method and admixture for accelerating the rate of hardening and strength gain of calcium aluminate cement mixes to provide quick setting and quick hardening neat cements, grouts, mortars and concretes upon inclusion of water.

Still another object of the invention is to provide hydraulic cement compositions comprising calcium aluminate cement either with or without aggregate material or ready mixes which can be dry-packaged and which provide, when mixed with water, setting times and early compressive strengths which adapt the compositions or ready mixes for use as a grout, mortar, or concrete where quick setting and highearly strength development are necessary or desirable. Another object is the provision of improved calcium aluminate cement mixes to provide quick setting, high early strength grouts, mortars and concretes. A further object of the invention is to provide a method for preparing a calcium aluminate cement mix adapted to be used as a grout, mortar, or concrete where fast setting and high-early strength development are necessary or desirable. Another object of the invention is to provide an additive for calcium aluminate cementitious compositions which provides a composition having improved early setting times and early compressive strengths which adapt it for use as a grout, mortar, or concrete composition or the like which in the case of mortar when mixed with water in a weight ratio not in excess of about 0.6 and preferably not in excess of 0.5 or less water per part by weight of cement has a flow of about 100% to about 115% as determined by ASTM-C-109.

The foregoing objects and others are accomplished in accordance with this invention, generally speaking, by providing a hydraulic cement composition comprising calcium aluminate cement containing calcium formate in an amount which upon inclusion of water to effect hydraulic setting of the cement will accelerate the compressive strength gain of the cement at a rate whereby the early compressive strength and the setting time adapt it for use as a grout, mortar, or concrete for patching, toppings or the like. The invention thus contemplates mixtures of calciuim aluminate cement and calcium formate accelerator and mixtures of calcium aluminate cement, calcium formate and various aggregate materials, and products prepared therefrom by addition or inclusion of water, wherein such mixtures contain the calcium formate in at least an amount which significantly accelerates the rate of gain of compressive strength of the product formed within the first six hours after water to effect hydraulic setting of the cement is added to or included in said mixture materially over the rate of gain of compressive strength of the product formed from a similar mixture without the calcium formate. In addition the product formed after addition of water exhibits setting times significantly less than that for similar calcium aluminate cement mixes without the calcium formate.

Other objects, features and advantages of this invention will become apparent from the following drawings and detailed description of the invention which follow.

Referring to the drawings, FIG. 1 is a graph illustrating the effect of calcium formate on the early compressive strength of a mortar prepared with a calcium aluminate cement herein called Type A for reference purposes;

Figure 1:
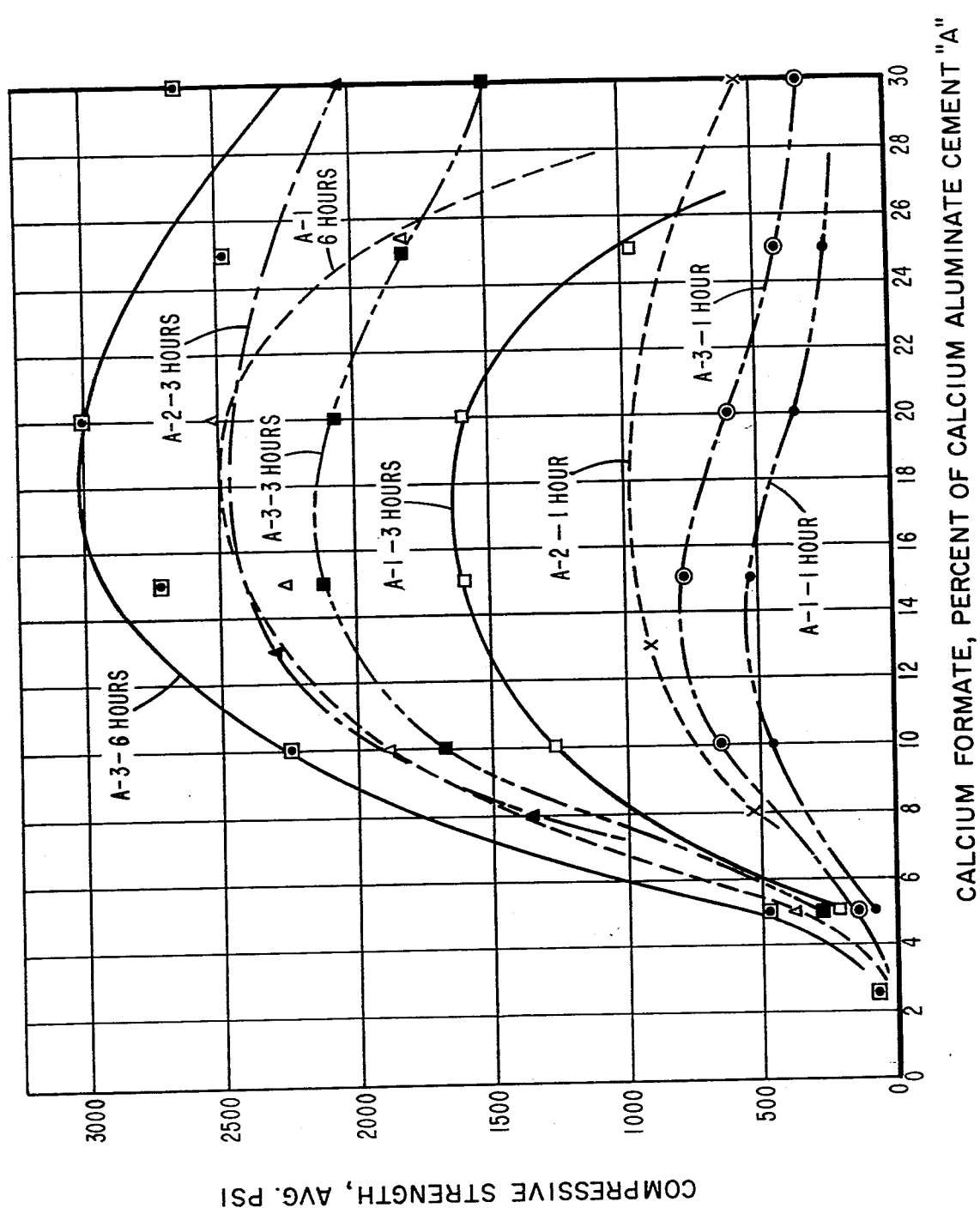

FIG. 5 is a graph illustrating the penetration resistance of concrete prepared with Type A cement with and without the accelerator of this invention, the penetration resistance being determined by the ASTM-C-403 test method; and FIG. 6 is a graph illustrating the compressive strength of mortars prepared with calcium aluminate cements of different chemical compositions with 10%, 15% and 20% calcium formate.

This invention in one of its broader aspects involves hydraulic cement compositions comprising calcium aluminate cement for use for cement mixes of the types which include neat cement mixes, cement mortar mixes and cement concrete mixes. The composition comprises the calcium aluminate cement and additive material comprising calcium formate. The calcium formate is present at least in an amount which when included in a Standard Cement Mortar Mix (hereinafter defined) containing said calcium aluminate cement will provide a product, formed after addition of water for hydraulic setting of the cement, exhibiting setting times significantly less and compressive strengths within six hours after water addition significantly greater than those exhibited by similar mortar compositions without calcium formate. Usually the $Al_xO_3$ plus $TiO_2$ content of the cement should be less than 70% by weight of the cement and broadly the calcium formate should be within the range about 6% to about 30% by weight of the cement. In its broadest form, the invention applies similarly to calcium aluminate cement compositions containing calcium formate, which may comprise grout, mortar or concrete mixtures, and to the calcium aluminate cement mixes formed when water is included in any of the above compositions and to the method for preparing such mixes. Also, the invention relates to a method for accelerating the rate of hardening and strength gain of calcium aluminate cement mixes containing from 0% to about 85% by weight aggregate material based on the total dry cement plus aggregate material in the mix. Mixes based on this invention are particularly well adapted to application as shotcrete sometimes known as pneumatically applied mortar.

When calcium formate is included in amounts within the range about 6% to about 30% by weight of the cement in Standard Cement Mortar Mixes in which the cement is a calcium aluminate cement, in most instances the products formed after the inclusion of water for hydraulic setting of the cement as prescribed for Standard Cement Mortar Mixes exhibit essentially throughout said range final setting times within the range about 7 to about 35 minutes as determined at about 70° F. by the Designated Test Method for mortars for the test involved. All of the calcium aluminate cements so tested provided final setting times within the range 7 to 35 minutes through at least a substantial portion of the calcium formate range 6 to 30%. Also, the rate of gain of compressive strengths of the resulting products within six hours after water inclusion were found to be significantly higher than in the case of similar products without the calcium formate.

It has been found that if the amount of calcium formate added is within the range of about 8% to about 25% by weight of the calcium aluminate cement in Standard Cement Mortar Mixes, the products formed after inclusion of water for hydraulic setting of cement in the amount prescribed for the Standard Cement Mortar Mix, will usually have a 1-hour compressive strength of at least 200 psi, a 3-hour compressive strength of at least 500 psi and a 6 hour compressive strength of at least 1000 psi, throughout the said range and a final setting time within the range about 7 to about 35 minutes throughout the said calcium formate range as determined at about 70° F. by the Designated Test Method (hereafter defined) for cement mortars appropriate for the tests involved. Moreover, for all of the calcium aluminate cement so tested the resulting products exhibited compressive strengths and final setting times having the aforementioned values through most of the calcium formate weight range about 8 to about 25%.

In accordance with this invention it is preferred to control the amount of calcium formate used for any calcium aluminate cement composition whether it be a mixture for grouts, mortars, or concretes, in at least an amount within the range about 8% to about 25% by weight of the cement present which will provide the aforementioned final setting times and compressive strengths when the calcium aluminate cement and the calcium formate are included in a Standard Cement Mortar Mix.

As regards final setting times the range about 7 to about 35 minutes is applicable in all cases whether the calcium aluminate cement composition involved is to be used for grouts, mortar or concrete mixes.

It is further preferred that the amount of calcium formate be at least that which will provide initial setting times in a Standard Cement Mortar Mix containing the calcium aluminate cement involved within the range about 6 to about 25 minutes. This also is applicable whether the composition involved is to be employed for grout, mortar or concrete mixes.

On the same basis as discussed above, in a more preferred form of the invention, the initial setting time should be within the range about 9 to about 18 minutes and the final setting time within the range about 10 to about 30 minutes. This is applicable whether the composition involved is for use in a neat cement, mortar or concrete mix. Where grout mixes are involved the initial setting time ranges more likely to be applicable are for initial setting time about 6 to about 25 minutes broad and about 7 to about 14 minutes preferred and for final setting times about 7 to about 35 minutes broad and about 8 to about 18 minutes preferred. Where mortar and concrete mixes are involved the setting time ranges more likely to be applicable are for initial setting times about 9 to about 25 minutes broad and about 9 to about 18 minutes preferred and for final setting times about 10 to about 35 minutes broad and about 15 to about 30 minutes preferred.

The most improvement in early compressive strengths has been found to be obtained when the amount of calcium formate is from about 10% to about 24% by weight of the calcium aluminate cement and this is the most preferred range in accordance with this invention.

The amount of calcium formate required to produce, for example, a mortar product having the one, three, and six hour compressive strengths and the final setting times referred to above will vary somewhat with the type of calcium aluminate cement and its fineness or particle size distrubution. In this connection, for reasons hereinafter discussed, it is desirable to limit the content of $Al_2O_3$ plus $TiO_2$ in calcium aluminate cement employed in accordance with this invention to less than 70% by weight. For such calcium aluminate cements containing less than about 70% by weight $Al_2O_3$ plus $TiO_3$ when used in Standard Cement Mortar Mixes along with calcium formate in the weight percent ranges hereinabove set forth, the products formed after inclusion of the water for effecting hydraulic setting of the cement will in general have compressive strength gains within six hours, and initial and final setting times which reasonably approximate or meet those requirements set forth above. Moreover, differences can be compensated by relatively small adjustment in the amount of calcium formate included within the weight percent ranges set forth above.

In the case of mortar mixes, a Standard Cement Mortar Mix containing calcium aluminate cement and a specific amount of calcium formate may provide initial and final setting times and one, three, and six hour compressive strength values differing somewhat from those which would be obtained by subjecting given mortar mixes which are not Standard Cement Mortar Mixes but which contain the same cement and the same amount of calcium formate to testing by what would be otherwise the Designated Test Method for mortars for the appropriate tests involved. These differences arise from differences in the nature, amount, size and grading of the aggregate involved, which in turn influence the amount of water required to provide a suitable consistency or flow for the mix. This is shown in Table I in which three mixes are compared in which the cement is the calcium aluminate cement elsewhere herein referred to as Cement "A". Calcium formate has been included in amount 10% by weight of the cement and sand aggregate is included in the differing proportions indicated in the Table. Also water was added to each mixture to produce a flow value between 100% and 125% with 25 drops of the flow table as determined at about 70° F. in accordance with ASTM-C-109 test method as applied to the particular three mixes shown in Table I. Sample 1 in Table I is a Standard Cement Mortar Mix (hereinafter defined) prepared in accordance with ASTM-C-109-73 test method.

In accordance with ASTM-C-109-73 the sand is Ottawa sand graded between Sieve Numbers 30 to 100 in accordance with ASTM Specification E-11 for sieves, the grading being that prescribed by ASTM-C-109-73. The mixes in samples 2 and 3 differ from the mix of sample 1 in respect to the proportion of cement to sand employed and in respect of the grading of the Ottawa sand employed. For samples 2 and 3 the sand was graded between sieve numbers 20 to 30 (as shown in ASTM-(778) instead of the standard grading described above for sample 1. The effect of the difference in cement to sand ratio and in the grading of the sand on the water required to provide the desired percent flow and on the one, three and six hour compressive strengths and on the initial and final setting times is shown in the Table. The compressive strength tests were conducted in accordance with ASTM-C-109-73 except for the differences in sand described above, and the setting times were determined with Gillmore needles as employed in ASTM-C-266-73.

TABLE I

| Sample No. | 1 | 2 | 3 |
|---|---|---|---|
| Cement to Sand Weight Ratio | 1:2.75 | 1:4 | 1:2 |
| Sand Grading — Sieve-No Range (ASTM-E-11 Specification) | 20–100 | 20–30 | 20–30 |
| Water to Cement Weight Ratio | .43 | .52 | .34 |
| Flow, Percent | 108 | 100 | 111 |
| Calcium Formate % Wt. of Cement | 10 | 10 | 10 |
| Compressive Strength Avg. Psi | | | |
| 1 hour | 453 | 326 | 2650 |
| 3 hours | 1273 | 937 | 4708 |
| 6 hours | 1908 | 1337 | 6166 |
| Setting Time, minutes | | | |
| Initial | 11 | 12 | 9 |
| Final | 22 | 21 | 12 |

It will be apparent from Table I that the amount and grading of the aggregates do affect the setting time values to a minor extent and the early compressive strength values somewhat more noticeably, within the ranges covered. Nevertheless, the early compressive strength values and setting time values remain within the desirable ranges in accordance with this invention. However, when the required water exceeds about 60% by weight of the cement present, the desired setting time and high early compressive strength values are very difficult if not impossible to provide for calcium aluminate cement-calcium formate compositions. It will be noted that for Sample 2 of the sand aggregate amounted to eighty percent by weight of the total aggregate plus cement present. This is approaching the maximum of 85% beyond which this invention is not considered to be applicable.

This is particularly true in the case of early compressive strength values. Hence, the present invention is applicable only to calcium aluminate cement mixes for which the required amount of water is not in excess of 60% and preferably not in excess of 50% by weight of the cement present. When these limits are observed the differences between setting time and compressive strength values obtained for any particular cement mix involved and those obtained for a Standard Cement Mortar Mix containing the same calcium aluminate cement and the same amount of calcium formate are reduced to practical annd tolerable proportions.

When the content of $Al_2O_3$ plus $TiO_2$ in the calcium aluminate cement is below 70% by weight the amount of aggregate is not in excess of about 85% by weight of the total aggregate plus cement, and the grading and amount of the aggregate material are controlled to permit restricting the amount of water required for the mix to not in excess of about 60% and preferably not in excess of about 50% by weight of the cement. Then within the allowable ranges for calcium formate inclusion of about 8 to 25 percent by weight of the cement it is usually possible for a given calcium aluminate cement composition or mix involved to meet at least the minimum early compressive strength and the setting time requirements in accordance with this invention by use of an amount of calcium formate at least equal to that found to be required or desirable for a Standard Cement Mortar Mix containing the sand cement, and in any case by a reasonably moderate adjustment of the amount of calcium formate employed (still within the aforementioned permitted ranges for calcium formate) from that required in a Standard Cement Mortar Mix containing the same cement, taking into consideration the pertinent factors discussed above. The same is true for neat cement mixes and concrete mixes as long as the limiting factors discussed above are observed.

The most improvement in early compressive strengths particularly in the case of mortars is obtained when the amount of calcium formate is from about 10% to about 24% by weight of the calcium aluminate cement, so calcium aluminate cement containing calcium formate in an amount within this range is preferred. However, amounts of calcium formate within the range of about 8% to about 25% by weight consistently produce hydrated products from the calcium aluminate cement mixes of the various types having acceptable early compressive strengths and setting times and can be used to advantage in most applications, and cements containing calcium formate in an amount within this broad range are generally preferred over those containing more than about 25% or less than about 8% calcium formate.

From the above it will be apparent that of particular interest are those aspects of the invention involving the use of calcium aluminate cements together with calcium formate in or for mortar mixes and concrete mixes or for the preparation thereof and the use of calcium formate for accelerating the rate of hardening and strength gain of calcium aluminate cement composition containing aggregate material. Thus in this aspect the invention is concerned with the use of an additive material comprising calcium formate, in mortar and concrete compositions or mixes comprising calcium aluminate cement and aggregate material in an amount within the range about 25% to about 85% by weight based on the total dry cement and aggregate material. More broadly the invention is also concerned with neat cement or grout mixes comprising calcium aluminate cement and additive material comprising calcium formate. Thus in this broader aspect the invention is concerned with hydraulic cement mixes or compositions and the preparation thereof comprising calcium aluminate cement, aggregate material in amount within the range 0% to about 85% by weight based on the total of the dry cement and aggregate material and calcium formate in the amounts disclosed herein.

Referring now to the test, test methods, and test samples referred to in describing and claiming this invention, the term "Standard Cement Mortar Mix" refers to that standard mix for cement mortars described in the ASTM-C-109-73 test method.

In accordance with ASTM-C-109-73, since calcium aluminate cement is not a Portland cement, the amount of water used in the mix is adjusted to that which will produce a present flow of 110 plus or minus 5, i.e., about 105 to about 115. The amount of water required for the Standard Cement Mortar Mix containing calcium aluminate cement as the cement determined in the above manner is referred to herein in describing and claiming this invention as the amount of water appropriate for or prescribed for the Standard Cement Mortar Mix.

In order to avoid variables which otherwise intervene, it is preferred to indicate the amount of calcium formate to be used in accordance with this invention in terms of what is requred in a Standard Cement Mortar Mix (containing the calcium aluminate cement involved) to provide the desired setting times and early compressive strengths. However, it is possible also to determine and express the amount of calcium formate required on the basis required in a "Designated Cement Mix" (hereinafter defined) to provide the desired setting and early compressive strength. The "Designated Cement Mix" as defined herein differs depending on the type of calcium aluminate composition or mix involved, whether grout, mortar or concrete mix.

In the case of mortars it is the same as the Standard Cement Mortar Mix. In the case of setting time determinations, the term "Designated Cement Mix" as used herein in describing and claiming this invention refers to the following: for neat cement mixes, the cement paste composition described in ASTM-C-266-74 test method made up of course of the particular calcium aluminate cement — calcium formate composition involved in any instance; for mortar mixes, the "Standard Cement Mortar Mix"; and for concrete mixes, the particular concrete mix involved which for test purposes is sieved as prescribed in ASTM-C-403-70 test method to provide a mortar for purposes of the test. In the case of compressive strength determinations, the term "Designated Cement Mix" refers to the following: for neat cement mixes, the particular calcium aluminate cement — calcium formate composition involved in accordance with the procedure for mixing pastes described in ASTM-C-305, the amount of water being adjusted to provide a paste consistency conducive to good fabrication of test cubes for testing in accordance with ASTM-C-109-73 test method (modified as to the sample tested); for mortar mixes, the Standard Cement Mortar Mix, and for concrete mixes, the particular concrete mix involved in the sample in question.

The term "Designated Test Method(s)" as used herein in describing and claiming this invention refers in the case of the setting time determinations to the following: for neat cement mixes, the ASTM-C-266-74 test method; for mortar mixes, the ASTM-C-266-74 test method using a Gillmore needle modified by substituting for the Standard cement paste the Standard Cement Mortar Mix in accordance with ASTM-C-109-73; and for concrete mixes the ASTM-C-403-70 test method. In the case of compressive strength determinations, the "Designated Test Method(s)" are: for neat cement mixes, the ASTM-C-109-73 test method modified as to the above indicated nature of the neat cement paste sample being tested; for mortar samples, the ASTM-C-109-73 test method; and for concrete mixes the ASTM-C-39-72 test method. In the case of all tests the cement employed is the particular cement involved, and calcium formate in the amount required for the particular mix in question is incorporated in the "Designated Cement Mix" or in the "Standard Cement Mortar Mix" involved.

Percent flow determinations are made on "Standard Cement Mortar Mixes" containing the cement and amount of calcium formate involved and having the compositions prescribed by ASTM-C-109-73 and tested in accordance with that test method.

In all cases "initial setting times" and "final setting" times as used in describing and claiming this invention refer to the period of time measured from the time water was added to the test mix involved to the time of initial or final set as determined by the appropriate Designated Test Method for the type of mix involved. Aslo as used herein the terms "one hour compressive strength", "three hour compressive strength", and "six hour compressive strength" refer to the compressive strength as determined by the Designated Test Method appropriate for the type of mix or composition involved at one, three or six hours, respectively, after addition of water to the mix composition involved. Thus, for example, the appropriate "Designated Test Method" for mortars is the ASTM-C-109-74 test method for compressive strength and flow determinations, and ASTM-C266-74 for initial and final setting time determinations. It has been found convenient to conduct all of the aforementioned tests at about 70° F.

The following examples will serve to illustrate the invention, it being understood that the same are intended merely as illustrative and not limitative.

A calcium aluminate cement made by fusion in a reverberatory furnace is represented by a commercial product hereinafter referred to as cement "A". A calcium aluminate cement made by sintering in a rotary kiln is represented by a commercial product hereinafter referred to as cement "B". An example of cement "A" is "CEMENT FONDU" calcium aluminate cement produced by the Lone Star Lafarge Company. An example of cement "B" is "LUMNITE" calcium aluminate cement produced by the Universal Atlas Cement Division of U.S. Steel Corporation. Other examples of calcium aluminate cements include a low-iron product hereinafter referred to as cement "C", and a pure white-colored product hereinafter referred to as cement "D". A commercial example of cement "C" is "REFCON" calcium aluminate cement produced by Universal Atlas Cement Division of U.S. Steel Corporation.

Typical chemical analyses of these calcium aluminate cements are shown below in Table II:

TABLE II

| Component | Kinds of High Alumina Cement | | |
| --- | --- | --- | --- |
| | A | B | C |
| $Al_2O_3$ | 40 | — | — |
| $TiO_2$ | <2 | — | — |
| CaO | 38 | 35.8 | 33.5 |
| $Fe_2O_3$ | 11 | 8.5 | 1.5 |
| FeO | 4 | — | — |
| $SiO_2$ | <5 | 8.6 | 5.6 |
| $Na_2O$ | — | — | — |
| MgO | — | 0.7 | — |
| $Al_2O_3+TiO_2$ | <42 | 44.0 | 58.0 |
| $SO_3$ | — | 1.7 | 0.4 |

While these various examples of calcium aluminate cements have broadly similar compositions and properties, they do not respond exactly the same to additives. As indicated hereinabove, factors which may influence the variation in calcium formate effectiveness include composition and particle size of the cement and the conditions under which the cement was prepared. Hence, there is some variation between the setting times and the rate of gain of compressive strength of the product formed after addition of water to mixes containing calcium formate and any of these various examples of calcium aluminate cement, for example, mortar mixes. However, it will be noted from FIGS. 1 and 2 that Standard Cement Mortar Mixes containing these calcium aluminate cements and calcium formate provided products, formed after inclusion of water in amount prescribed for Standard Cement Mortar Mix for hydraulic setting of the cement, having one hour, three and six hour compressive strengths of at least 200 psi, 600 psi and 1000 psi respectively, throughout the calcium formate range of about 8% to about 25% by weight of the cement. On the other hand, a calcium aluminate cement in which the $Al_2O_3$ plus $TiO_2$ content is 79% has been found not to respond to calcium formate like the cement such as cements A, B and C, in accordance with this invention. A commercial example of the aforementioned cement is herein referred to as Cement D, which is commercially called Ca-25 Calcium Aluminate Cement produced by Aluminum Company of America. The composition of cement D is 79%, $Al_2O_3$, 18% CaO, 0.3$Fe_{23}$, 0.15% $SiO_2$, 0.5% $Na_2O$ and 0.4% Mg O by weight. The $Al_2O_3$ and $Al_2O_3$ plus $TiO_2$ percentages of cements A, B, C and D are plotted against the compressive strength of mortars containing 10% calcium formate prepared in accordance with ASTM-C109 in FIG. 6 of the drawings. From this graph, it can be seen that in order to obtain a 1 hour compressive strength of at least about 200 psi, the cement should contain not more than about 70% $Al_2O_3$ or $Al_2O_3+TiO_2$.

Figure 2:
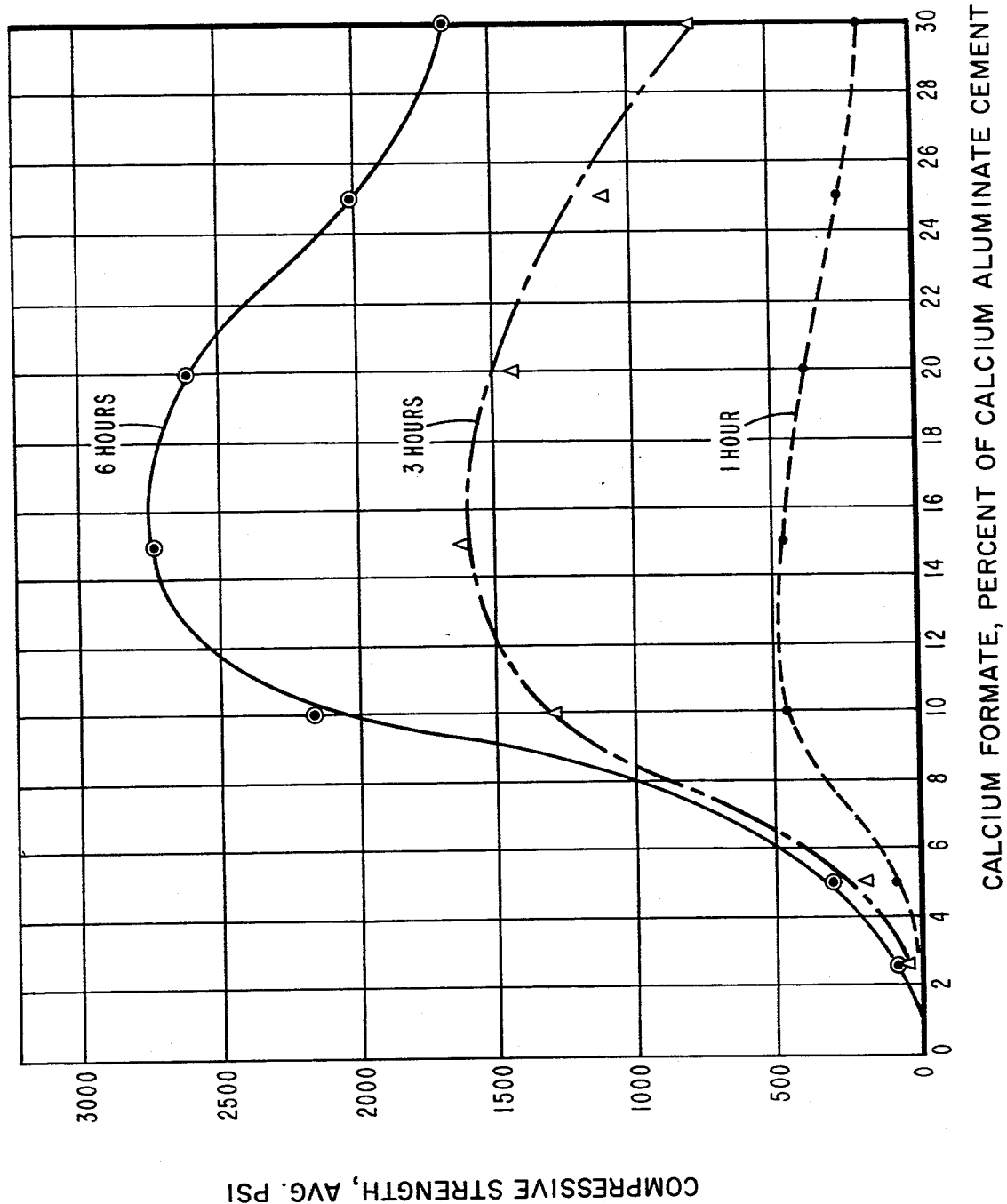
FIG. 2 is a graph illustrating the effect of calcium formate on the early compressive strength of mortars prepared with three different samples of a calcium aluminate cement herein called Type B for reference purposes.

Referring now to FIG. 1, there is graphically shown the effect of including calcium formate in various percentages by weight of the cement in Standard Cement Mortar Mixes containing three different samples of the calcium aluminate cement, herein referred to as Type A, on the one, three and six hour compressive strengths of the product formed after addition to the mixes of the sufficient water to effect hydraulic setting of the cement. As prescribed after Standard Cement Mortar Mixes by ASTM-C-109-73 test method, the three samples of calcium aluminate cement were taken from different commercial batches and the data reflect the manner in which factors such as particle size and the conditions under which the cement is prepared can influence to some extent the response of the cement to calcium formate. However, it will be noted that all of these samples responded to the calcium formate in accordance with this invention and the described acceleration of the rate compressive strengths was provided in the case of each test sample. FIG. 2 graphically shows a similar effect in accordance with this invention resulting from inclusion of various percentages of calcium formate in Standard Cement Mortar Mixes containing a calcium aluminate cement of the kind referred to as Type C. All of the data for the graphs in FIGS. 1, 2 and 3 were obtained on Standard Cement Mortar Mixes containing fine aggregate material and calcium aluminate cement having compositions as prescribed by ASTM-C-109 and the compressive strengths were determined in accordance with the ASTM-C-109 test method at about 70° F. The 1, 3 and 6 hours compressive strengths refer to the period of time from the time when the water was added to the mortar mixes containing the calcium aluminate cement.

Figure 3:
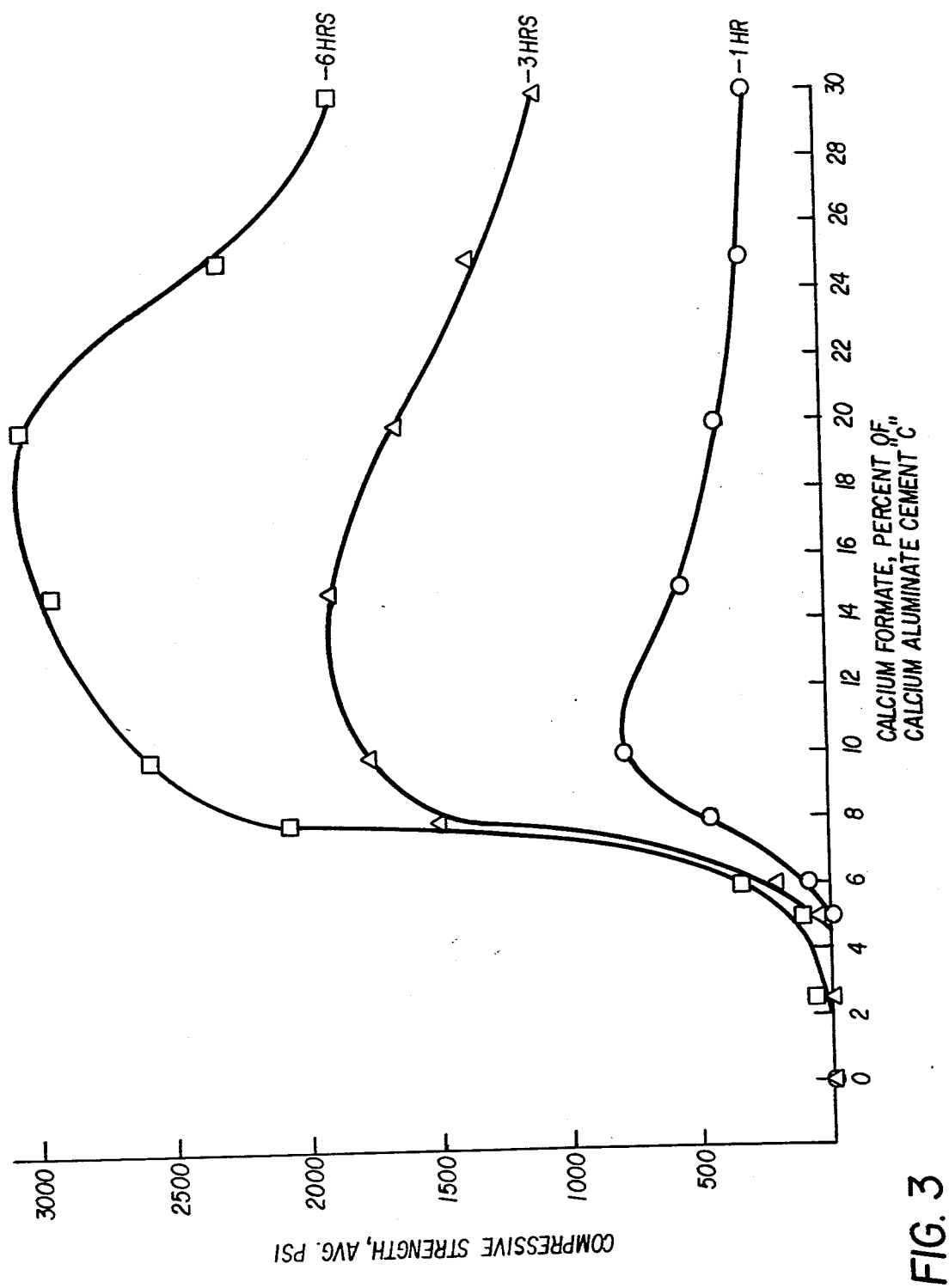
FIG. 3 is a graph illustrating the effect of calcium formate on the early compressive strength of a mortar prepared with a calcium aluminate cement herein called Type C for reference purposes.

The critical nature of the required control of the amounts of calcium formate included in calcium aluminate cement containing compositions or mixes in accordance with this invention is readily apparent from the nature of the curves shown in FIGS. 1, 2 and 3. It will also be noted that the broad range of about 8% to about 25% by weight of cement and the preferred range about 10% to about 24% by weight of the cement are of critical nature and apply to all of the calcium aluminate samples involved in FIGS. 1, 2 and 3. Thus in each case at 8% by weight or higher of calcium formate, the one hour compressive strength is well about 200 psi, the three hour compressive strength is at least about 500 psi and the six hour compressive strength is at least about 1000 psi. There is a significant improvement in compressive strength after one hour with 8% calcium formate over smaller amounts. Within the range about 8% to about 25% calcium formate, the resulting compressive strength of the hydrated product formed from the mortar mixes is significantly greater than at lower or higher percentages. However, at calcium formate percentages down to about 6% and up to about 30% the one hour compressive strength and particularly the compressive strength within six hours after water inclusion are significantly greater than those for the similar motars without calcium formate.

The following additional examples, in which all parts are by weight unless otherwise specified, illustrate the application of the invention to various types of compositions which are quick-setting and have high early compressive strengths.

EXAMPLE I

Employing other materials known in the art for their normal purposes, a potentially commercial patching composition was prepared by dry mixing substantially uniformly

| | |
|---|---|
| 29.82% | pea gravel aggregate |
| 40.85% | graded slica sand |
| 1.00% | silica flour |
| 0.03% | calcium lignosulfonate |
| 23.00% | high alumina cement |
| 3.00% | calcium formate |
| 2.30% | gypsum powder |
| 100.00% | Total |

The high alumina cement may be either cement kind "A" or cement kind "B", but the cement kind "A" is preferred. About 100 pounds of this mixture is mixed at room temperature with about 8.7 pounds of water. This mixture contains about 13% by weight of calcium formate based on the weight of cement. The product containing cement kind "A" and the indicated amount of water has a slump of about 3 inches and the following typical average values of compressive strength in average psi as determined at about 70° F. by ASTM-C-109 test method modified by using the mix involved instead of the mix prescribed by ASTM-C-109.

| 1 hour | 3 hours | 6 hours | 24 hours |
|---|---|---|---|
| 1270 | 4366 | 6000 | 7015 |

A product made from a similar formulation (100 lbs. of the dry mixture plus 8.2 lbs. of water) but without calcium formate has a slump of about 2½ inches and typical compressive strengths in psi by the same ASTM test method used for the prescribing example of:

| 1 hour | 3 hours | 6 hours | 24 hours |
|--------|---------|---------|----------|
| 0 | 0 | 87 | 5116 |

EXAMPLE II

Another example of a possible commercial patching composition is prepared by dry mixing

| | |
|---|---|
| 5.85% | graded iron aggregate |
| 26.82% | pea gravel aggregate |
| 37.00% | graded silica sand |
| 2.00% | silica flour |
| 0.03% | calcium lignosulfonate |
| 23.00% | high alumina cement |
| 3.00% | calcium formate |
| 2.30% | gypsum powder |
| 100.00% | Total |

Preferably, the high-alumina cement is cement kind "A".

About 100 pounds of the dry mixture are mixed at room temperature with about 8.5 pounds of water, and the product with kind "A" cement has a slump of 3½ inches and the following compressive strengths in psi as determined at about 70° F. as determined by ASTM-C-109 test method modified by substitution of the mix involved for the Standard Cement Mortar Mix prescribed by ASTM-C-109.

| 1 hour | 3 hours | 6 hours | 24 hours |
|--------|---------|---------|----------|
| 1050 | 3975 | 5633 | 6516 |

A product prepared from a similar formulation but without calcium formate has a slump of about 3 inches typical compressive strengths in psi of:

| 1 hour | 3 hours | 6 hours | 24 hours |
|--------|---------|---------|----------|
| 0 | 50 | 88 | 5191 |

The calcium aluminate cement and calcium formate mixtures provided by the invention may be mixed without any suitable fine and coarse aggregate compositions ordinarily used in preparing grouts, mortars, and concrete compositions. In the foregoing examples, the graded iron aggregate has the following particle size distribution:

| U.S. Sieve No. | % Passing, by Weight |
|----------------|----------------------|
| 4 | 100 |
| 8 | 90–100 |
| 16 | 75–90 |
| 30 | 45–60 |
| 50 | 10–22 |
| 100 | 4–15 |

Preferably, the fine and coarse aggregates should be selected to meet all of the requirements as to grading and quality of ASTM Designation C 33.

EXAMPLE III

A high strength patching composition is prepared by mixing substantially uniformly in percent by weight

| | |
|---|---|
| 35.00% | pea gravel |
| 40.85% | graded silica sand |
| 0.02% | calcium lignosulfonate |
| 1.52% | fly ash |
| 20.00% | cement "A" |
| 2.61% | calcium formate |
| 100.00% | Total |

About 100 pounds by weight of the dry mixture is mixed with about 7.1% pounds by weight of water (.85 gallons per 100 pounds). The resulting product has a slump of about 2 inches, an initial setting time of about 12 minutes, a final set of about 16 minutes, as determined by ASTM-C266 modified by substitution of the mix involved for the neat cement part prescribed in ASTM-C-266 and a compressive strength of about:

| 1 hour | 3 hours | 6 hours |
|--------|---------|---------|
| 1095 | 4090 | 5325 |

A similar mixture without calcium formate has a slump of 0 inch, initial setting time of 1 hour and 35 minutes, a final setting time of 2 hours and 35 minutes, as determined by ASTM-C-266 modified by substitution of the mix involved for the neat cement part prescribed by ASTM-C-266 and compressive strengths by ASTM-C-109 (modified as above indicated) of:

| 1 hour | 3 hours | 6 hours |
|--------|---------|---------|
| 0 | 0 | 0 |

As a comparative example, a high strength patching composition is prepared by mixing substantially uniformly in percent by weight

| | |
|---|---|
| 29.82% | pea gravel aggregate |
| 40.85% | graded silica sand |
| 1.00% | silica flour |
| 0.03% | calcium lignosulfonate |
| 23.00% | cement "D" |
| 3.00% | calcium formate |
| 2.30% | gypsum powder |
| 100.00% | Total |

One hundred pounds of this formulation were mixed with 1.31 gallons (10.9 pounds) of water to yield a product having characteristics as shown below when tested as described above:

| | |
|---|---|
| Slump | 3 inches |
| Compressive Strength, (as determined by ASTM-C-109 (modified as above indicated at about 70° F.) average psi | |
| 1 hour | 133 |
| 3 hours | 1278 |
| 6 hours | 2808 |
| 24 hours | 4803 |

It will be noted that the calcium aluminate cement mixes involved in Examples I–IV are a type falling in the borderline region between that what might be classified as mortar and concrete mixes. These mixes have been treated herein as mortar mixes and thus the applicable Designated Test methods for mortars have been employed. However, in the compressive strength tests the particular mix involved was employed instead of the mix prescribed by ASTM-C-109 and for the setting time tests the particular mix involved was used instead of the neat cement paste called for by ASTM-C-266.

As has been indicated hereinabove it is usually most convenient and preferred to determine or indicate the amount of calcium formate to be used in order to provide the desired setting time and compressive strength in accordance with this invention for the particular calcium aluminate compositions or mixes involved in any given instance, whether neat cement, mortar or concrete compositions or mixes in terms of what is required in a Standard Cement Mortar Mix or alternatively in terms of what has been defined herein as a Designated Cement Mix. However, it will be apparent from the above Example I through IV that the required amount of calcium formate may be determined or expressed on the basis of testing the particular cement composition actually involved. In other words one may include in the particular calcium aluminate cement composition or mix involved calcium formate in at least one amount within the range about 6% to about 30% or preferably within the range about 8% to about 25% by weight of the cement, which, when water for hydraulic setting of the cement is added to said composition or included in said mix, will provide an acceleration of the rate of gain of compressive strength and initial and final setting times within the ranges herein indicated to be desirable and attainable, as determined on the specific cement composition or mix involved instead of the Standard Cement Mortar Mix or instead of the Designated Cement Mix as the case may be, at about 70° F. by the appropriate Designated Test Methods for the tests and types of cement compositions or mixes involved.

EXAMPLE V

Two concretes are prepared at room temperature of about 70° F. with composition as follows:

| Component | Percent, by weight Plain Mix | Mix Containing Calcium Formate |
|---|---|---|
| Cement "A" | 16.56 | 16.50 |
| Fine Aggregate | 31.47 | 31.35 |
| Coarse Aggregate | 45.39 | 45.21 |
| Calcium Formate | — | 1.65 |
| Tap Water | 6.58 | 5.29 |
| Total | 100.00 | 100.00 |

In the example above the calcium formate was added to the mix as a dry powder and after addition of water both mixes were workable consistency as determined by slump vlaue. The plan admixture had a slump of 2¼ inches and the mix containing the admixture had a slump of 3½ inches. The measurements were made in accordance with ASTM-C-143-71.

Figure 4:
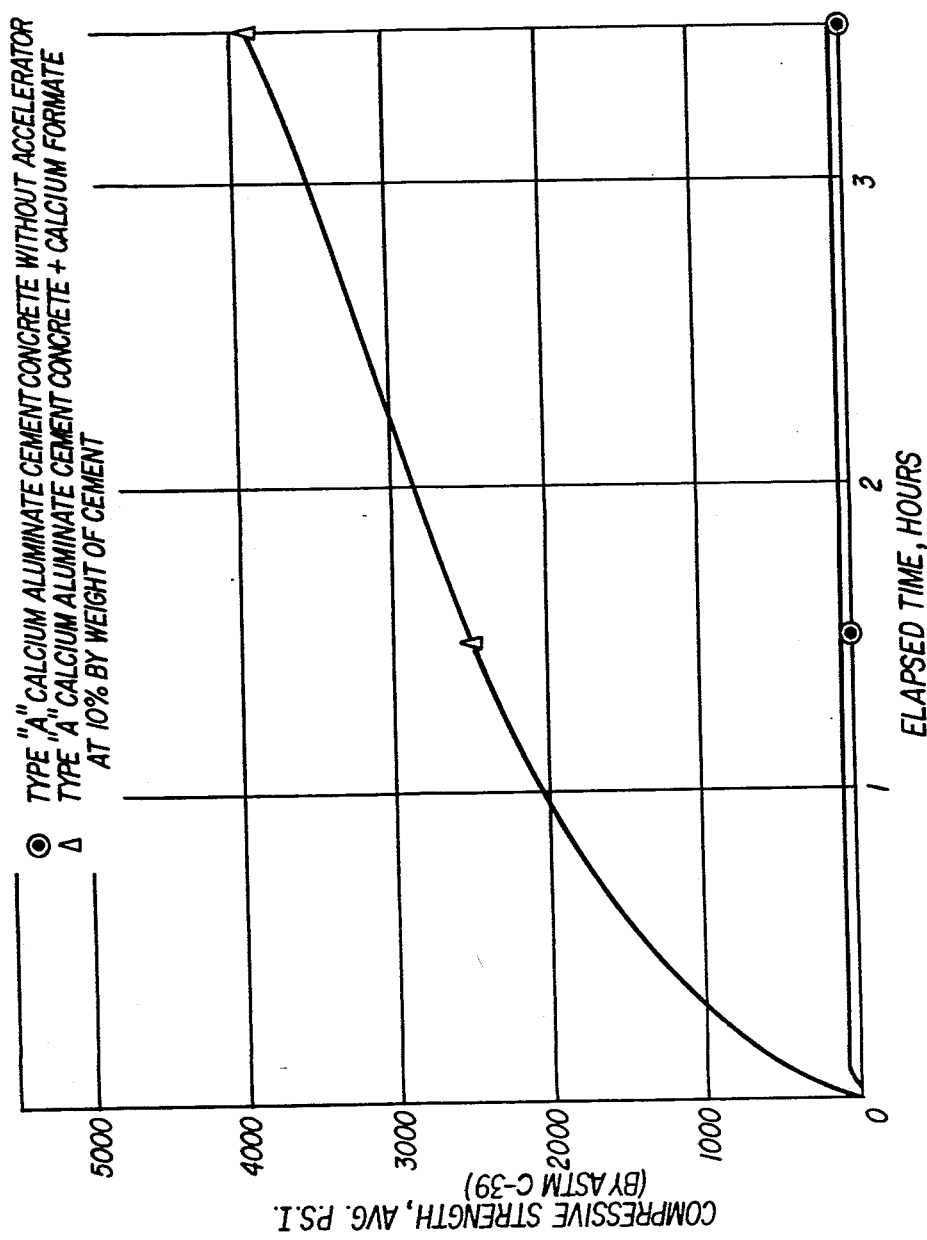
FIG. 4 is a graph illustrating the compressive strength ofconcrete prepared with Type A cement with and without the accelerator of this invention.

The rates of hardening the early compressive strength values are shown for the two mixes in FIGS. 4 and 5. The test procedures are identified by the ASTM references on the respective figures. The data indicate that in the zero to 3½ hour time interval rate of hardening and strength developed of concrete containing the formate as specified a product is obtained which is useful where such high early strength values are needed and that this cannot be attained with a plain mix.

In general for mortars the aggregate may be sand or other fine aggregate meeting the requirements of ASTM Designations C33. The size range may vary depending upon the desired use and properties of mortar. In general the size may fall within the broad range of about 4 mesh to - 100 mesh as determined by ASTM-C-136-71. With respect to purity and quality the sand generally should comply with ASTM-C33 requirements.

For quick setting concretes the aggregate may consist of coarser aggregate material within the broad size of range about 3 inch mesh to No. 4 mesh as determined by ASTM-C136-71 and more frequently within the range of one inch to 4 mesh. The coarse aggregate is usually of mineral origin such as gravel or crushed rock, but it may in some cases consist at least partially of graded metallic material such as iron chips, slag, or other manufactured aggregate.

In accordance with this invention the concrete mixes may contain any of a wide range of proportions of fine and coarse aggregate.

In general the proportion of fine aggregate in dry mortar mixes may fall within the range of about 25% to about 75% by weight of the mix depending upon the nature of the aggregate and the desired properties of the mix.

The proportions of fine and coarse aggregate in concrete mixes prior to addition of water may fall within the broad range of 20 to 80 percent by weight of the mix for the fine aggregate and 5 to 60 percent for the coarse aggregate, depending upon desired properties and use of the mix.

In general, sufficient water should be added to effect hydraulic setting of the cement present in the mix and to provide suitable workability. In general in accordance with this invention the calcium aluminate cement mix which may be a grout mix, a mortor mix or a concrete mix should have a water to cement weight ratio not in excess of about 0.6 and preferably not in excess of 0.5 in order to permit attainment of the desired quick setting and early strength characteristics. The proportions of water in mortar mixes will depend on the amount and nature of cement and aggregate present and the conditions of use. This may broadly range from about 20% to 60% by weight of the cement in the mix preferably not in excess of 50% and more frequently within the range of about 30 to 45% by weight of the cement.

For neat cements and for concretes the amount of water should also be sufficient to effect hydraulic setting of the cement present and to produce suitable consistency. For neat cements this will vary depending on particle size and composition of the cement and will fall generally within the broad range of about 25% to about 50% by weight of the cement. concretes the amount of water will depend upon the size and composition of the cement and aggregate present. Generally the amount of water for concrete mixes may fall within the broad range of about 15 to about 45% by weight of the cement and more frequently within the range of about 25 to 40% by weight of the cement.

The hydraulic cement mixes are prepared usually at ambient temperatures within the range of about 50° F. to about 80° F. but sometimes may be prepared at temperatures down to about 35° F. or up to about 125° F. For use of such mixes at lower range of temperature, the strength development can be accelerated by use of warm or hot mixing water. For use at the higher range of temperature, part or all of the mixing water may be added in the form of ice. The order in which the constituents of the mix are added is in general optional and can depend on the nature of the product supplied to the customer and containing the calcium formate. Where the calcium formate is supplied to the user as such, or in combination with other admixtures known to the art and used for the purposes for which they are normally employed, the cement and any fine aggregate and/or coarse aggregate are mixed and the calcium formate or additive material containing calcium formate may then be added with or before the water. When the product supplied to the customer is a ready-mix product containing cement, aggregate and additive, or cement and additive, it is only necessary for the user to add the required water.

Additional examples of useful products based on this invention are shown below. It is understood that in these examples other additives such as calcium lignosulfonate known in the art may be used in conventional amounts for their particular functions in addition to calcium formate.

a. Calcium Aluminate Cement plus additive This calcium aluminate cement composition product consists of from 6 and preferably from 8% by weight calcium formate and 94 or 92% by weight of cement respectively to 30 and preferably to 25% by weight of calcium formate and 70 or 75% cement respectively.

b. Calcium Aluminate Cement plus additive plus aggregate (coarse, fine, or both) This calcium aluminate cement composition product could contain from about 20 to 30 percent by weight of cement, 1.2 to 9.0 percent by weight and preferably 1.6 to 7.5 percent by weight of calcium formate, and the balance fine aggregate material. Also, another example might contain 20 to 30 percent by weight of cement, and 1.5 to 13.5 percent by weight and preferably 2.0 to 7.2 percent by weight of calcium formate, and the balance aggregate material in which the proportions of fine aggregate to coarse aggregate may be in the weight ratio of from about 0.5 to 2 to one.

c. The product sold to a consumer may consist of 100 percent by weight of calcium formate. This may be added to the cement composition or mix in amounts indicated by the user. The user could produce the following hydraulic cement mixes:

1. A product or mixture consisting of 6 and preferably 8 percent by weight of calcium formate and 94 percent respectively by weight of cement is mixed with preferably less than 37.6 percent by weight of water. Another product would consist of up to 30 percent and preferably up to 25 percent by weight of calcium formate and 70 percent and preferably 75 percent respectively by weight of cement mixed with preferably less than about 28 percent by weight of water.

2. 100 parts of the dry mixture, shown in example (b) above, are mixed with 2 to 12 parts water.

d. The product sold to a consumer may consist of calcium formate together with other additives known in prior art and used for the purpose for which they are normally employed, provided that any such additive does not materially interfere with the effectiveness of the calcium formate for purposes discussed herein. Such other additives for example may be a set retarding agent such as calcium lignosulfonate or a water repellant or coloring material, gypsum powder and silica flour.

The surprising increase in one, three and six hour compressive strengths and on initial and final setting times of mortars prepared from calcium aluminate cement and calcium formate is illustrated in Table III. Also, the results reported in Table III for Portland cement and calcium formate show that the effect of calcium formate on the early compressive strength of mortars prepared from calcium aluminate cannot be predicted from results obtained with mortars prepared from Portland cement. Calcium formate in amounts within the range contemplated by this invention does not produce a similar result with Portland cement.

The composition of the calcium aluminate containing mortar samples tested aside from the calcium formate, was in each case in accordance with ASTM-C-109-73 (i.e., Standard Cement Mortar Mixes) and the flow and the compressive strengths were determined in accordance with the ASTM-C-109 test method. The setting time tests were in each case conducted on mortar samples having composition in accordance with ASTM-C-109 test method, and tested in accordance with ASTM-C-266 modified by substitution of the mortar sample in place of a neat-cement paste sample. All tests were conducted at a temperature of about 70° F. The mortar composition used with the Portland cement-calcium formate and the calcium aluminate cement-calcium formate compositions of Table III were the same except for the type of cement and the indicated differences in amount of water.

TABLE III

| Cement | Accelerator | % Accelerator | W/C*** | Flow % | Compressive Strength Tests Average, psi (ASTM-C-109) | | | Setting Time* Hours-Minutes (ASTM-C-266) | |
|---|---|---|---|---|---|---|---|---|---|
| | | | | | 1-Hour | 3-Hours | 6-Hours | Initial | Final |
| Portland | Calcium Formate | 0 | .49 | 114 | Too Soft | Too Soft | 62 | 2-27 | 3-55 |
| | | 5.0 | .50 | 102 | Too Soft | Too Soft | Too Soft | 1-31 | 5-57 |
| | | 10.0 | .51 | 110 | Too Soft | 71 | 98 | 0-23 | 0-35 |
| | | 15.0 | .56 | 110 | 66 | 108 | 140 | 0-20 | 0-36 |
| | | 20.0 | .55 | 112 | 135 | 240 | 295 | 0-14 | 0-24 |
| | | 25.0 | .54 | 100 | 210 | 390 | 517 | 0-20 | 0-33 |
| Calcium Aluminate Cement "A" | Calcium Formate | 0.0 | .45 | 109 | Too Soft | Too Soft | 100 | 2-12 | 4-11 |
| | | 1.0 | .43 | 103 | Too Soft | Too Soft | Too Soft | 1-42 | 4-56 |
| | | 2.5 | .47 | 113 | Too Soft | 37 | 49 | 0-35 | 1-58 |
| | | 5.0 | .47 | ** | 88 | 226 | 356 | 0-10 | 0-32 |
| | | 10.0 | .43 | 108 | 453 | 1273 | 1908 | 0-11 | 0-22 |
| | | 15.0 | .43 | 106 | 523 | 1588 | 2286 | 0-15 | 0-25 |
| | | 20.0 | .44 | 102 | 345 | 1606 | 2525 | 0-15 | 0-27 |
| | | 25.0 | .44 | 104 | 248 | 994 | 1806 | 0-18 | 0-31 |
| Calcium Aluminate Cement "B" | Calcium Formate | 0.0 | .47 | 112 | Too Soft | Too Soft | Too Soft | 2-45 | 6-56 |
| | | 1.0 | .45 | 112 | Too Soft | Too Soft | Too Soft | 1-45 | 4-03 |
| | | 2.5 | .47 | 106 | Too Soft | 40 | 59 | 0-52 | 2-00 |

TABLE III-continued

| Cement | Accelerator | % Accelerator | W/C*** | Flow % | Compressive Strength Tests Average, psi (ASTM-C-109) | | | Setting Time* Hours-Minutes (ASTM-C-266) | |
|---|---|---|---|---|---|---|---|---|---|
| | | | | | 1-Hour | 3-Hours | 6-Hours | Initial | Final |
| | | 5.0 | .50 | ** | 65 | 170 | 283 | 0-12 | 0-37 |
| | | 10.0 | .44 | 106 | 450 | 1298 | 2166 | 0-11 | 0-16 |
| | | 15.0 | .45 | 109 | 455 | 1635 | 2721 | 0-16 | 0-25 |
| | | 20.0 | .45 | 111 | 375 | 1380 | 2604 | 0-17 | 0-22 |
| | | 25.0 | .47 | 112 | 241 | 1089 | 2015 | 0-17 | 0-28 |
| Calcium Aluminate Cement "C" | Calcium Formate | 0 | .46 | 109 | 0 | 0 | 0 | 4-40 | 8-04 |
| | | 1.0 | .46 | 112 | 0 | 0 | 0 | 2-10 | 4-14 |
| | | 2.5 | .50 | 98 | 0 | 0 | 40 | 0-42 | 1-41 |
| | | 5.0 | .68 | 94 | 0 | 35 | 95 | 0-25 | 1-33 |
| | | 6.0 | .60 | 98 | 75 | 205 | 335 | 0-45 | 1-25 |
| | | 8.0 | .46 | 117 | 440 | 1495 | 2065 | 0-18 | 0-24 |
| | | 10.0 | .46 | 115 | 780 | 1755 | 2585 | 0-10 | 0-13 |
| | | 15.0 | .46 | 114 | 550 | 1890 | 2935 | 0-13 | 0-21 |
| | | 20.0 | .46 | 110 | 405 | 1630 | 3050 | 0-13 | 0-18 |
| | | 25.0 | .46 | 102 | 300 | 1350 | 2293 | 0-20 | 0-27 |
| | | 30.0 | .47 | 104 | 275 | 1065 | 1870 | 0-14 | 0-24 |

*Setting Time Test Pats Made from C 109 Mortars
**Mortar stiffened rapidly - could not test for flow
***Water to Cement Weight Ratio As indicated in the discussion of possible commercial products described above, the composition of the aggregate and the amount of other additives which may be used in practicing the invention will vary depending upon the properties desired in the finished product.

By contrast to cements "A", "B" and "C", for mortars of the same compositions as those for Table III except that cement "D" was employed, it was found that for 0% calcium formate the one, three and six-hour compressive strengths were 0, 140 and 320 psi, respectively; and the initial and final setting times were 48 minutes and one hour and twenty minutes respectively. For 8% calcium formate the one, three and six-hour compressive strengths were 65, 195 and 395 respectively and the initial and final setting times were 27 minutes and 37 minutes respectively. For 15% calcium formate addition, the one, three and six-hour compressive strengths were 10, 310 and 800 psi respectively, and the intitial and final setting times were 45 minutes and one hour and eighteen minutes respectively. The percent flow as determined by ASTM-C-109 for 0% 8% and 15% calcium formate addition were 100 percent, 105 percent and 114 percent respectively. The water to cement weight ratio was 0.46 for the sample without calcium formate and 0.55 for the other samples. It will be noted that while in the case of this cement the use of calcium formate caused a material decrease in the initial and final setting times the needed improvement in early compressive strength is not provided.

In Table IV, data are presented showing the beneficial effect of calcium formate in accordance with this invention in neat cement mixes containing calcium formate and in one case the cement A and in the other cement B (both hereinabove identified). The neat cement compositions were prepared and tested for setting time in accordance with ASTM-C-266 test method with Gillmore needles.

The compressive strength tests were conducted in accordance with ASTM-C-109 test method except that no sand was used in the mixture and in place of the Standard Cement Mortar Mix the particular cement-calcium formate mixtures involved were used and the pastes for testing were mixed in accordance with the ASTM-C-305 procedure for mixing pastes. A constant water to cement ratio was used that produced a paste consistence conducive to good fabrication of the test cubes. Setting time specimens were made from the same batch of freshly-mixed paste as employed for the compressive strength tests.

TABLE IV

| Cement | Calcium Formate % of Cement | W/C* | Compressive Strength, Average Psi | | | | Setting Time, Hours-Minutes | |
|---|---|---|---|---|---|---|---|---|
| | | | 1 Hour | 3 Hours | 6 Hours | 24 Hours | Initial | Final |
| "A" | 0 | .20 | 0 | 0 | 0 | 12463 | 6-07 | 6-37 |
| | 5.0 | .20 | 5283 | 6850 | 7516 | 8441 | 0-05 | 0-07 |
| | 8.0 | .20 | 7033 | 8475 | 9800 | 10758 | 0-07 | 0-09 |
| | 15.0 | .20 | 6441 | 9242 | 10258 | 11313 | 0-06 | 0-08 |
| | 25.0 | .20 | 4287 | 7708 | 9483 | 10208 | 0-06 | 0-08 |
| "B" | 0 | .228 | 0 | 0 | 0 | 8966 | >9-08 | >9-08 |
| | 5.0 | .228 | 2100 | 4183 | 6250 | 8188 | 0-11 | 0-15 |
| | 8.0 | .228 | 3225 | 6525 | 8208 | 9116 | 0-10 | 0-14 |
| | 15.0 | .228 | 2183 | 4950 | 6483 | 8925 | 0-14 | 0-18 |
| | 25.0 | .228 | 1742 | 3925 | 5475 | 8875 | 0-13 | 0-17 |

*Water to Cement Weight Ratio

The very marked increase in early compressive strength and reduction of initial and final setting times resulting from inclusion of calcium formate in the calcium aluminate cement neat cement paste mix within the percentage ranges hereinabove discussed is readily apparent from the data in Table IV. The critical nature of the calcium formate effect within the ranges about 6 to about 30 and particularly about 8 to about 25 percent calcium formate is apparent from graphs similar to these in FIGS. 1 – 3 which can be made from the data in Table IV.

Although the invention is described in detail for the purpose of illustration, it is to be understood that such detail is soley for that purpose and that variations can be made therein by those skilled in the art without departing from the spirit and scope of the invention except as it may be limited by the claims.

What we claim is:

1. A hydraulic cement composition comprising: calcium aluminate cement, aggregate material in amount within the range of to about 85% by weight based on the total weight of the dry cement and aggregate material, and additive material comprising calcium formate in at least an amount (a) which accelerates the rate of gain of compressive strength of the hydrated product, formed within the first six hours after water for hydraulic setting of the cement is added to said composition, materially over the rate of gain of compressive strength of the hydrated product formed from a similar composition without calcium formate and (b) which provides, when included in a Standard Cement Mortar Mix containing said cement, a final setting time of about 7 to about 35 minutes after inclusion of water prescribed for said Standard Cement Mortar Mix as determined at about 70° F. by the appropriate Designated Test Method for mortars.

2. The hydraulic cement composition according to claim 1 wherein the cement contains less than about 70% by weight $Al_2O_3$ plus $TiO_2$ and the amount of calcium formate is within the range of about 6% to about 30% by weight of the cement.

3. A calcium aluminate cement composition comprising: calcium aluminate cement, aggregate material in amount within the range of 0% to about 85% by weight based on the total weight of the dry cement and aggregate material, and additive material comprising calcium formate in at least an amount within the range about 8% to about 25% by weight of the cement corresponding to that which, when included in a Standard Cement Mortar Mix containing said calcium aluminate cement, will provide a product, formed after addition of water for hydraulic setting of the cement prescribed for the Standard Cement Mortar Mix, having a one hour compressive strength of at least 200 psi and a final setting time of about 10 to about 35 minutes as determined at about 70° F. by the Designated Test Methods for Cement Mortars appropriate for the tests involved.

4. The calcium aluminate cement composition of claim 3 wherein the cement contains less than about 70% by weight $Al_2O_3$ plus $TiO_2$ and said calcium formate is present in at least an amount corresponding to that which will insure, when included in said Standard Cement Mortar Mix, a product formed after inclusion of said water having an initial setting time within the range about 6 to about 25 minutes as determined at about 70° F. by the appropriate Designated Test Method for Mortars.

5. A calcium aluminate cement composition containing in addition to calcium aluminate cement, having a content of $Al_2O_3$ plus $TiO_2$ of less than 70% by weight, about 0% to 85% by weight aggregate material based on the total dry cement and aggregate material in the composition, and containing additive material comprising calcium formate, said calcium formate being present in at least an amount within the range of about 8% to about 25% by weight of the cement, which accelerates the rate of gain of compressive strength of the product, formed within the first six hours after water for hydraulic setting of the cement in water to cement ratio, not in excess of 0.6, is added to said composition, materially over the rate of gain of compressive strength of the product formed from a similar composition without calcium formate and which, would provide when incorporated with said calcium aluminate cement in a Designated Cement Mix of type appropriate to the said calcium aluminate cement composition involved, a final setting time of about 7 to about 35 minutes after addition of water in an amount not in excess of about 60 percent by weight of the cement to said Designated Cement Mix, as determined at about 70° F. using the appropriate Designated Test Methods for the type of cement composition and test involved.

6. A calcium aluminate cement composition for use for cement mixes of the type, neat cement mixes, cement mortar mixes and cement concrete mixes, said composition comprising: calcium aluminate cement and additive material comprising calcium formate, said calcium formate being present in at least an amount which materially accelerates the rate of gain of compressive strength of the product, formed within the first six hours after water for hydraulic setting of the cement in an amount not in excess of about 60% by weight of the cement is incorporated into any of said types of cement mixes containing said composition, over the rate of gain of compressive strength of the product formed from a similar cement mix without calcium formate, said cement composition being characterized by quick setting properties wherein a Standard Cement Mortar Mix prepared with this cement composition will provide a product, formed after inclusion of water in said Standard Cement Mortar Mix in the prescribed amount, having a final setting time of about 7 to about 35 minutes as determined at about 70° F. by the appropriate Designated Test Method for mortars.

7. The calcium aluminate cement composition of claim 6 wherein the calcium aluminate cement contains less than about 70% by weight $Al_2O_3$ plus $TiO_2$ and the amount of calcium formate is within the range about 6% to about 30% by weight of the cement.

8. A calcium aluminate cement composition comprising calcium aluminate cement in which the $Al_2O_3$ plus $TiO_2$ content is less than about 70%, and about 8 to about 25% calcium formate by weight of the cement, said cement composition being characterized by quick setting and quick hardening properties wherein a Standard Cement Mortar Mix prepared with said cement composition will provide a product, formed after inclusion of water in appropriate amount for said Standard Cement Mortar Mix, having a final setting time of about 7 to about 35 minutes and a one-hour compressive strength of at least 200 psi as determined at about 70° F. by the designated Test Methods for mortars appropriate for the tests involved.

9. The calcium aluminate cement composition of claim 8, wherein the amount of calcium formate is within the range about 10% to 24% by weight of the cement and the initial setting time is within the range about 6 to about 25 minutes.

10. A quick setting, quick hardening calcium aluminate cement composition for use in cement mixes containing aggregate material which comprises: a calcium aluminate cement having an $Al_2O_3$ plus $TiO_2$ content less than about 70% by weight and calcium formate in at least an amount within the range about 10% to about 24% by weight of the cement, which when included in a Standard Cement Mortar Mix containing said cement, will assure a produce, formed after inclusion of the amount of water prescribed for Standard Cement Mortar Mix, having an initial setting time of about 9 to about 18 minutes, a final setting time of about 15 to 30 minutes and a one-hour compressive strength of at least 200 psi as determined at about 70° F. by the Designated Test Methods for mortars appropriate for the tests involved.

11. A quick setting and quick hardening calcium aluminate cement composition containing calcium aluminate cement in which the content of $Al_2O_3$ plus $TiO_2$ is less than about 70% by weight and additive material comprising calcium formate, said calcium formate being present in at least an amount within the range about 8% to about 25% by weight of the cement which, when incorporated with said calcium aluminate cement in a Standard Cement Mortar Mix will provide a hydrated product, formed after inclusion of water, in amount appropriate for said Standard Cement Mortar Mix, having a final setting time of about 7 to about 35 minutes and a one-hour compressive strength of at least 200 psi, as determined at about 70° F. by the Designated Test Methods for mortars applicable to the tests involved.

12. The cement composition according to claim 11, wherein the amount of calcium formate is at least sufficient to provide when incorporated in said Standard Cement Mortar Mix an initial setting time of about 6 to 25 minutes and a three-hour compressive strength of at least 500 psi.

13. The cement composition according to claim 11, wherein calcium formate is present in at least an amount within the range about 10% to about 24% by weight of the cement, which would provide for said Standard Cement Mortar Mix an initial setting time of about 9 to about 18 minutes, a final setting time within the range of about 10 to about 30 minutes and a 3 hour compressive strength of at least 500 psi.

14. The cement composition according to claim 11, wherein said composition is a dry cement mortar mixture.

15. The cement composition according to claim 11, wherein said composition is a dry concrete mixture.

16. A hydraulic cement mix comprising: calcium aluminate cement, about 0% to about 85% by weight aggregate material based on the total dry cement and aggregate material in the mix, sufficient water to effect hydraulic setting of the cement not in excess of about 60 percent by weight of the cement and additive material comprising calcium formate, said calcium formate being in at least an amount within the range about 6% to about 30% by weight of the cement (a) which materially accelerates the rate of gain of compressive strength of the product formed within the first six hours after inclusion of the water in said mix over the rate of gain of compressive strength of the product formed from a similar mix without the calcium formate and (b) which would provide, when incorporated with said calcium aluminate cement in a Designated Cement Mix of the type appropriate to the type of said hydraulic cement mix involved, a final setting time of about 7 to about 35 minutes after inclusion of said water in amount not in excess of 60 percent by weight of the cement in said Designated Cement Mix, as determined by the appropriate Designated Test Method for the type of hydraulic cement mix involved at about 70° F.

17. A hydraulic cement mix according to claim 16, wherein the $Al_2O_3$ $TiO_2$ content of said calcium aluminate cement is less than 70% by weight of said cement and the calcium formate is least an amount within the range about 8% to about 25% by weight of the cement which would provide, when included in a Designated Cement Mix of type appropriate to the type of hydraulic cement mix involved containing said calcium aluminate cement, a product, formed after inclusion of water not in excess of 60 percent by weight of the cement, having an initial setting time of about 6 to about 25 minutes and a one-hour compressive strength of at least 200 psi, as determined at about 70° F. by the Designated Test Methods appropriate for the tests and type of cement mixes involved.

18. A hydraulic cement mix comprising: calcium aluminate cement, aggregate material, sufficient water to effect hydraulic setting of said cement, not in excess of about 60 percent by weight of the cement and additive material comprising calcium formate, said calcium formate being present in at least an amount of calcium formate within the range about 8% to about 25% by weight of the cement which, when incorporated with said calcium aluminate cement in a Standard Cement Mortar Mix would provide a hydrated product formed after inclusion of water in amount prescribed for said Standard Cement Mortar Mix, having a final setting time of about 10 to about 35 minutes and a one hour compressive strength of at least 200 psi, as determined at about 70° F. by the applicable Designated Test Methods for mortars.

19. A hydraulic cement mix of claim 18, wherein the $Al_2O_3$ plus $TiO_2$ content of said calcium aluminate cement is less than about 70% by weight of said cement.

20. A hydraulic cement mix according to Claim 19, wherein the amount of water is not in excess of about 50% by weight of the cement and the amount of calcium formate is sufficient to provide when incorporated in said Standard Cement Mortar Mix an initial setting time of about 9 to about 25 minutes and a three hour compressive strength of at least 500 psi.

21. A hydraulic cement mix according to claim 20, wherein the calcium formate is at least an amount within the range of about 10% to about 24% by weight of the cement which would provide for the product formed from said Standard Cement Mortar Mix an initial setting time within the range about 9 to about 18 minutes, a final setting time within the range about 15 to about 30 minutes and a 3 hour compressive strength of at least 500 psi.

22. A hydraulic cement mix according to claim 21, wherein said aggregate material is fine aggregate.

23. A hydraulic cement mix according to claim 22, wherein said hydraulic cement mix is a concrete mix.

24. A calcium aluminate cement mix comprising: calcium aluminate cement having an $Al_2O_3$ plus $TiO_2$ content of less than 70% by weight, about 0% to 85% by weight aggregate material based on the total of the dry cement and aggregate material in said mix, sufficient water to effect the hydraulic setting of said cement and not in excess of 50 percent by weight of the cement, and additive material comprising calcium formate in an amount within the range about 8% to about 25% by weight of the cement, said cement mix being characterized in that when it is in the form of a Standard Cement Mortar Mix, the product formed after inclusion of said water in said mix, has a one-hour compressive strength of at least 200 psi and a final setting time of about 7 to about 35 minutes, as determined on said Standard Cement Mortar Mix at about 70° F. by the Designated Test Method for mortars appropriate for the test involved.

25. The method for accelerating the rate of hardening and strength gain of a calcium aluminate cement mix containing in addition to calcium aluminate cement about 0% to 85% by weight aggregate material based on the total dry cement and aggregate material in the mix, and sufficient water to effect hydraulic setting of the cement, which comprises: including in said mix composition an additive material comprising calcium formate in at least an amount which accelerates the rate of gain of the compressive strength of the product formed within the first six hours after inclusion of said water in said mix materially over the rate of gain of compressive strength of the product formed from a similar mix composition without calcium formate, and which would provide, when incorporated with said calcium aluminate cement in a Standard Cement Mortar Mix, a final setting time of about 7 to about 35 minutes after inclusion of water prescribed for said Standard cement Mortar Mix, as determined at about 70° F. by appropriate Designated Test Method for mortars for the test involved.

26. The method of claim 25, wherein the calcium aluminate cement content of $Al_2O_3$ plus $TiO_2$ is less than about 70% by weight of said cement, the amount of water in said mix is not in excess of about 60% and the calcium formate incorporated in said cement composition is within the range about 8% to about 25% by weight of the cement.

27. The method of claim 25, wherein said calcium aluminate cement has a content of $Al_2O_3$ plus $TiO_2$ of less than 70% by weight, and the calcium formate included in said composition is at least an amount within the range about 8% to about 25% by weight of the cement which, when incorporated in a Standard Cement Mortar Mix containing said calcium aluminate cement will provide, after inclusion of water in an amount prescribed for said Standard Cement Mortar Mix, an initial setting time of about 6 to about 25 minutes and a one hour compressive strength of at least 200 psi, as determined by the Designated Test Methods for Mortars appropriate for said tests.

28. The method of claim 27, wherein the calcium formate is at least an amount within the range about 10% to about 24% by weight of the cement which would provide for the product formed from said Standard Mortar Mix and initial setting time within the range about 9 to about 18 minutes, a final setting time within the range about 10 to about 30 minutes and a 3 hour compressive strength of at least 500 psi.

29. The method of claim 27, wherein said aggregate material is fine aggregate material.

30. The method of claim 27, wherein said calcium aluminate cement mix is a concrete mix.

31. The method for accelerating the rate of hardening and strength gain of a calcium aluminate cement mix containing a calcium aluminate cement having an $Al_2O_3$ plus $TiO_2$ content less than about 70% by weight, and sufficient water to effect hydraulic setting of the cement which consists essentially of limiting the amount of water in said mix below about 60 percent by weight of the cement and inclusing in said mix additive material comprising calcium formate, said calcium formate being an amount within the range about 6% to about 30% by weight of the cement, whereby said mix exhibits setting times significantly less and one and three hour compressive strengths significantly higher than similar calcium aluminate cement mixes without said calcium formate.

32. A method of preparing a hydraulic cement mix having quick setting and high early strength development which comprises mixing with a calcium aluminate cement composition water to effect hydraulic setting of the cement and an additive material comprising calcium formate, said calcium formate being in at least an amount which, after said water inclusion in said mix, (a) will within the first six hours, accelerate the gain of compressive strength of the resulting formed product materially over that of the product formed from a similar hydraulic cement mix without calcium formate and (b) would provide, when included in a Standard Cement Mortar Mix containing said cement a final setting time of about 7 to about 35 minutes, after inclusion of water in the amount prescribed for said Standard Cement Mortar Mix, as determined at about 70° F. by the appropriate Designated Test Method for mortars appropriate for the test involved.

33. The method of claim 32, wherein said calcium aluminate cement contains less than 70% by weight $Al_2O_3$ plus $TiO_2$; the amount of water in said mix is controlled less than 60 percent by weight of the cement and the amount of calcium formate is within the range about 6% to about 30% by weight of the cement.

34. The method for preparing a hydraulic cement mix having quick setting and high early strength development which comprises, mixing with a calcium aluminate cement having an $Al_2O_3$ plus $TiO_2$ content of less than about 70%, 0% to 85% by weight aggregate material based on the dry cement and aggregate material, water to effect hydraulic setting of the cement, not in excess of 60% by weight of the cement, and an additive material comprising calcium formate, said calcium formate being in at least an amount within the range about 8% to about 25% by weight of the cement, which when incorporated with said calcium aluminate cement in a Standard Cement Mortar Mix, having a final setting time of about 7 to about 35 minutes and a one-hour compressive strength of at least 200 psi, at about 70° F. by the Designated Test Methods for mortars for the tests involved.

35. The method according to claim 34, wherein the amount of calcium formate is sufficient to provide when incorporated with said calcium aluminate cement in said Standard Cement Mortar Mix an initial setting time of about 6 to about 25 minutes and a three-hour compressive strength of at least 500 psi.

36. The method according to claim 34, wherein said mix contains aggregate material within the range about 25% to about 85% by weight of the total dry cement plus aggregate material and about 10% to 24% calcium formate by weight of the cement.

37. The method of claim 34, wherein the calcium formate is at least an amount within the range about 10% to about 24% by weight of the cement which would provide for the product formed from said Standard Mortar Mix an initial setting time within the range about 9 to about 18 minutes, a final setting time within the range about 10 to about 30 minutes and a three-hour compressive strength of at least 500 psi.

* * * * *

UNITED STATES PATENT AND TRADEMARK OFFICE
CERTIFICATE OF CORRECTION

PATENT NO. : 4,033,782
DATED : July 5, 1977
INVENTOR(S) : James Allen Ray and Thomas Joseph Lazio It is certified that error appears in the above-identified patent and that said Letters Patent are hereby corrected as shown below:

In Column 1, line 46 "Cao" should be --CaO--
In Column 1, line 68 "highalumina" should be --high-alumina--
In Column 2, line 8 "highearly" should be --high-early--
In Column 3, line 25 "highearly" should be --high-early--
In Column 3, line 55 "calciuium" should be --calcium--
In Column 4, line 21 "ofconcrete" should be --of concrete--
In Column 5, line 37 "calciuim" should be --calcium--
In Column 6, line 23 "$TiO_3$" should be --$TiO_2$--
In Column 7, line 3 "ASTM-(778)" should be --ASTM-C-778)--
In Column 8, line 28 "the" should be deleted
In Column 9, line 12 "requred" should be --required--
In Column 10, line 12 "Aslo" should be --Also--
In Column 10, line 20 "ASTM-C-109-74" should be --ASTM-C-109-73--
In Column 10, line 22 "C266-74" should be --C-266-74--
In Column 11, line 22 "$Fe_{23}$" should be --$Fe_2O_3$--
In Column 11, line 28 "ASTM-C109" should be --ASTM-C-109--
In Column 11, line 39 "the" third occurrence should be deleted.
In Column 12, line 3 "in" should be --on--

UNITED STATES PATENT AND TRADEMARK OFFICE
CERTIFICATE OF CORRECTION

PATENT NO. : 4,033,782
DATED : July 5, 1977
INVENTOR(S) : James Allen Ray and Thomas Joseph Lazio It is certified that error appears in the above-identified patent and that said Letters Patent are hereby corrected as shown below:

In Column 12, line 10 "about" should be --above--
In Column 12, line 24 "motars" should be --mortars--
In Column 12, line 39 (in the table) "slica" should be --silica--
In Column 12, line 68 "prescribing" should be --preceding--
In Column 13, line 46 and 47 "with-out" should be --with--
In Column 14, line 14 "ASTM-C266" should be --ASTM-C-266--
In Column 14, line 35 insert --Example IV--
In Column 14, line 63 insert --of-- after are
In Column 14, line 64 "that" should be deleted
In Column 15, line 16 add --s-- to Example
In Column 15, line 17 insert --also-- after may
In Column 15, line 22 "one" should be --an--
In Column 15, line 53 "vlaue" should be --value--
In Column 15, line 53 "plan" should be --plain--
In Column 15, line 57 "the (second occurrence)" should be --and--
In Column 15, line 62 "developed" should be --development--
In Column 16, line 8 "of" should be deleted
In Column 16, line 9 insert --of-- after range
In Column 16, line 34 "mortor" should be --mortar--

UNITED STATES PATENT AND TRADEMARK OFFICE
CERTIFICATE OF CORRECTION

PATENT NO. : 4,033,782

DATED : July 5, 1977

INVENTOR(S) : James Allen Ray and Thomas Joseph Lazio

It is certified that error appears in the above-identified patent and that said Letters Patent are hereby corrected as shown below:

In Column 16, line 53 insert --For-- before concretes
In Column 17, line 21 "Calcium Aluminate Cement plus additive" should be
--Calcium Aluminate Cement plus additive--
In Column 17, line 28 & 29 "Calcium Aluminate Cement plus additive plus aggregate" should be --Calcium Aluminate Cement plus additive plus aggregate--
In Column 19, line 56 insert --,-- after 0%
In Column 20, line 67 "soley" should be --solely--
In Column 21, line 6 (Claim 1) insert --0%-- after of
In Column 22, line 64 (Claim 10) "produce" should be --product--
In Column 23, line 65 (Claim 17) insert --at-- after is
In Column 25, line 59 (Claim 31) "inclusing" should be --including--

UNITED STATES PATENT AND TRADEMARK OFFICE
CERTIFICATE OF CORRECTION

PATENT NO. : 4,033,782

DATED : July 5, 1977

INVENTOR(S) : James Allen Ray and Thomas Joseph Lazio

It is certified that error appears in the above-identified patent and that said Letters Patent are hereby corrected as shown below:

The following figure was omitted:

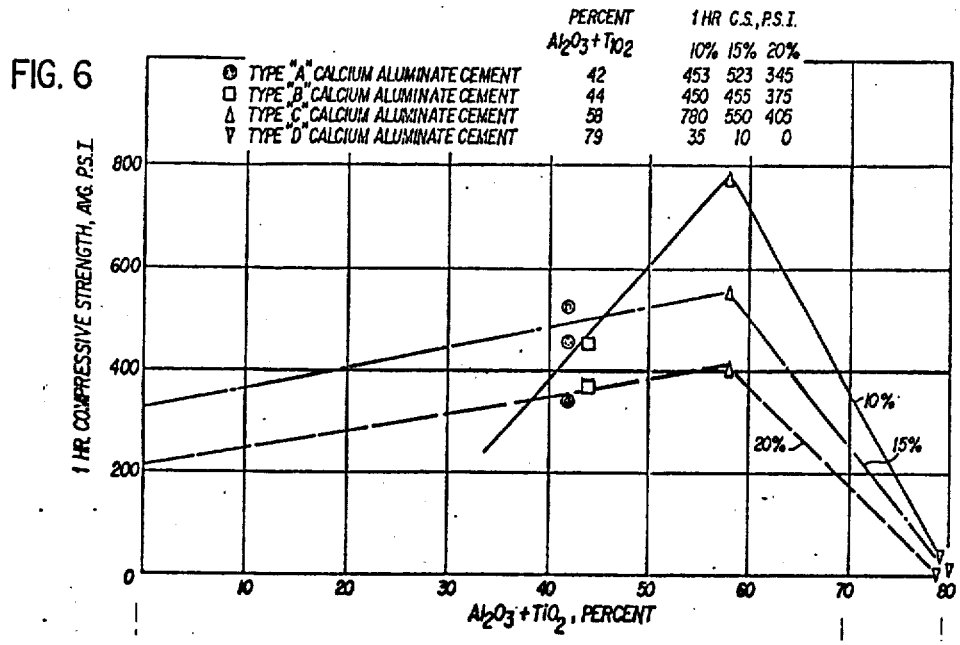

Signed and Sealed this

Eighteenth Day of October 1977

[SEAL]

Attest:

RUTH C. MASON
Attesting Officer

LUTRELLE F. PARKER
Acting Commissioner of Patents and Trademar